US007668228B2

(12) United States Patent
Feller et al.

(10) Patent No.: US 7,668,228 B2
(45) Date of Patent: Feb. 23, 2010

(54) APPARATUS FOR AND METHOD OF CORRELATING TO RISING CHIP EDGES

(75) Inventors: Walter J. Feller, Airdrie (CA); Patrick C. Fenton, Calgary (CA); Graham Purves, Cochrane (CA)

(73) Assignee: NovAtel Inc., Calgary, Alberta (CA)

( * ) Notice: Subject to any disclaimer, the term of this patent is extended or adjusted under 35 U.S.C. 154(b) by 562 days.

(21) Appl. No.: 11/520,353

(22) Filed: Sep. 13, 2006

(65) Prior Publication Data

US 2007/0064776 A1 Mar. 22, 2007

Related U.S. Application Data

(60) Provisional application No. 60/718,091, filed on Sep. 16, 2005.

(51) Int. Cl.
*H04B 1/707* (2006.01)
(52) U.S. Cl. ...................................... 375/148
(58) Field of Classification Search ............... 375/130, 375/140, 142, 144, 145, 147–150, 343; 701/207, 701/213; 342/357.01, 358.06, 357.12
See application file for complete search history.

(56) References Cited

U.S. PATENT DOCUMENTS

| 4,894,842 A | 1/1990 | Broekhoven et al. |
| 5,101,416 A | 3/1992 | Fenton et al. |
| 5,134,407 A | 7/1992 | Lorenz et al. |
| 5,390,207 A | 2/1995 | Fenton |
| 5,402,450 A | 3/1995 | Lennen |
| 5,414,729 A | 5/1995 | Fenton |
| 5,495,499 A | 2/1996 | Fenton et al. |
| 5,615,232 A | 3/1997 | Van Nee |
| 5,630,208 A | 5/1997 | Enge et al. |
| 5,654,980 A | 8/1997 | Latva-aho et al. |
| 5,764,686 A | 6/1998 | Sanderford et al. |
| 5,963,582 A | 10/1999 | Stansell, Jr. |
| 5,990,827 A | 11/1999 | Fan et al. |

(Continued)

FOREIGN PATENT DOCUMENTS

EP     0892277 A2     1/1999

(Continued)

OTHER PUBLICATIONS

Weill, "Multipath Mitigation Using Modernized GPA Signals: How Good Can it Get?", ION GPS 2002, Portland OR, Sep. 2002.

(Continued)

*Primary Examiner*—Tesfaldet Bocure
(74) *Attorney, Agent, or Firm*—Cesari and McKenna, LLP; Patricia A. Sheehan

(57) ABSTRACT

A receiver for position-determining ranging signals transmitted by earth-orbiting satellites uses a set of accumulators, each of which accumulates signal samples corresponding with a position along the rising edges of incoming PRN pulses. An MMT processor calculates the rising edges of the direct path component of the received signal, selects the accumulator whose content correspond to a reference value related to the pulse height of the direct path component and compares the timing of the samples in that accumulator with the timing of the reference value on a reference pulse.

12 Claims, 7 Drawing Sheets

U.S. PATENT DOCUMENTS

| | | |
|---|---|---|
| 6,031,881 A | 2/2000 | Weill et al. |
| 6,195,328 B1 | 2/2001 | Tsui et al. |
| 6,236,687 B1 | 5/2001 | Caso et al. |
| 6,259,401 B1 | 7/2001 | Woo |
| 6,370,207 B1 | 4/2002 | Weill et al. |
| 6,466,612 B2 | 10/2002 | Kohli et al. |
| 6,493,376 B1 | 12/2002 | Harms et al. |
| 6,493,378 B1 | 12/2002 | Zhodzishsky et al. |
| 6,532,251 B1 | 3/2003 | King et al. |
| 6,636,558 B1 | 10/2003 | Schnaufer et al. |
| 6,658,048 B1 | 12/2003 | Valio |
| 6,692,008 B2 | 2/2004 | Beck |
| 6,751,247 B1 | 6/2004 | Zhengdi |
| 6,788,731 B2 | 9/2004 | Kim et al. |
| 6,798,758 B1 | 9/2004 | Chun et al. |
| 6,912,242 B2 | 6/2005 | Farine et al. |
| 6,967,992 B1 | 11/2005 | Rabaeijs et al. |
| 7,224,721 B2 | 5/2007 | Betz et al. |
| 7,295,633 B2 | 11/2007 | Kohli et al. |
| 2002/0101912 A1 | 8/2002 | Phelts et al. |
| 2002/0181632 A1 | 12/2002 | Kang et al. |
| 2003/0227963 A1* | 12/2003 | Dafesh ................ 375/149 |
| 2004/0208236 A1 | 10/2004 | Fenton |
| 2005/0025222 A1 | 2/2005 | Underbrink et al. |
| 2006/0018371 A1 | 1/2006 | Medlock |

FOREIGN PATENT DOCUMENTS

| | | |
|---|---|---|
| WO | WO 97/06446 | 2/1997 |

OTHER PUBLICATIONS

Allan Manz, United States Patent Application for a "Method of Including Calibrated Pulse Shapes in GPS Receivers" filed Jun. 3, 2005, U.S. Appl. No. 11/145,442.

* cited by examiner

APPARATUS FOR AND METHOD OF CORRELATING TO RISING CHIP EDGES

RELATED APPLICATIONS

This application takes priority from U.S. Provisional Application Ser. No. 60/718,091, filed on Sep. 16, 2005, entitled APPARATUS FOR AND METHOD OF CORRELATING TO RISING CHIP EDGES by Walter J. Feller et al.

CROSS-REFERENCE TO RELATED APPLICATION

The present application is related to U.S. Patent Application Publication No. 2004/0208236, entitled APPARATUS FOR AND METHOD OF MAKING PULSE-SHAPE MEASUREMENTS, which is hereby incorporated by reference.

BACKGROUND OF THE INVENTION

1. Field of the Invention

The invention relates generally to systems for measuring the pulse shape of a broadcast spread-spectrum signal and, in particular, to systems that correlate to chip edges of PRN spread-spectrum ranging codes.

2. Background Information

One example of a system that utilizes broadcast spread-spectrum signals is a global positioning system, such as, GPS, GLONAS or GALILEO systems. The system receivers determine their global positions based on the signals they receive from associated satellites. Each of the broadcast spread-spectrum signals consists of a carrier that is modulated by at least one pseudorandom code, such as a binary PRN code that consists of a seemingly random sequence of one and zeros that periodically repeat. The ones and zeros in the PRN code are referred to as "code chips," and the transitions in the code from one to zero or zero to one, which occur at "code chip times," are referred to as "bit transitions" or "chip edges." Each satellite uses a unique PRN code, and thus, a receiver can associate a received signal with a particular satellite by determining which PRN code is included in the signal.

The receiver calculates the difference between the time a satellite transmits its signal and the time that the receiver receives the signal. The receiver then calculates its distance, or "pseudorange," from the satellite based on the associated time difference. Using the pseudoranges from at least four satellites, the receiver determines its global position.

To determine the time difference, the receiver synchronizes locally-generated PRN codes with the PRN codes in the received signal by aligning the code chips in each of local codes with the chips in the corresponding satellite-generated unique PRN codes. It then determines how much the locally-generated PRN codes are shifted, in time, from the known timing of the satellite PRN codes at the time of transmission, and calculates the associated pseudoranges by multiplying the measured time shifts by the speed of light. The more closely the receiver aligns the locally-generated PRN code with the PRN code in the received signal, the more precisely the receiver can determine the associated time difference and pseudorange and, in turn, its global position.

The code synchronization operations include acquisition of the satellite PRN code and tracking of the code. To acquire the PRN code, the receiver generally makes a series of correlation measurements that are separated in time by a code chip, to determine when the locally-generated code aligns with the received code to within one code chip. To thereafter track the PRN code, the receiver generally makes correlation measurements that are associated with the received PRN code and early and late versions of the locally-generated PRN code. The receiver thus produces an associated error signal that is proportional to the misalignment between the local PRN code and the received PRN code. The error signal is used, in turn, to control the PRN code generator, which shifts the local PRN code essentially to minimize the error signal.

The receiver also typically aligns a local carrier with the satellite carrier, using correlation measurements associated with a punctual version of the local PRN code. To do this the receiver uses a carrier-tracking phase lock loop.

The receiver receives not only line-of-sight, or direct path, satellite signals but also multipath signals, which are signals that travel along different paths and are reflected to the receiver from the ground, bodies of water, nearby buildings, etc. The multipath signals arrive at the receiver after the direct-path signal and combine with the direct-path signal to produce a distorted received signal. This distortion of the received signal adversely affects code synchronization operations because the correlation measurements, which measure the correlation between the local PRN code and the received signal, are based on the entire received signal—including the multipath components thereof. The distortion may even be such that the receiver attempts to synchronize to a multipath signal instead of to the direct-path signal. This is particularly true for multipath signals that have code bit transitions that occur close to the times at which code bit transitions occur in the direct-path signal.

One way to more accurately synchronize the received and the locally-generated PRN codes is to use the "narrow correlators" discussed in U.S. Pat. Nos. 5,101,416; 5,390,207 and 5,495,499. It has been determined that narrowing the delay spacing between early and late correlation measurements substantially reduces the adverse effects of noise and multipath signal distortion on the early-minus-late measurements. The delay spacing is narrowed such that the noise correlates in the early and late correlation measurements. Also, the narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak.

Another way to more accurately synchronize the received and the locally-generated PRN codes is to use a multipath mitigation (MMT) processing technique that iteratively produces estimates of the direct path signal and one or more of the multipath signals. One such technique is described in U.S. Pat. Nos. 5,615,232 and 6,692,008. Another technique that uses multiple correlators is described in U.S. Pat. No. 5,414,729. Yet another multipath mitigation technique is discussed in Weill, "Multipath Mitigation Using Modernized GPS Signals: How Good Can It Get," ION GPS 2002, Portland, Oreg., Sep. 24-27, 2002.

The multipath mitigation processing techniques are based on the manipulation of pulse-shape information that corresponds to samples of the received signal taken at discrete code-phase offsets. The samples are taken in synchronism with a sample clock, with a predetermined number of samples taken per code chip.

Each sample in the pulse is represented by three parameters $[\tau, A, \theta]$, where $\tau$ represents the time offset or code delay, $A$ represents the amplitude, and $\theta$ represents the phase angle. The basic form of the manipulations that extract the direct path signal, $[\tau_d, A_d, \theta_d]$, and two multipath signals, $[\tau_{mp1}, A_{mp1}, \theta_{mp1}]$ and $[\tau_{mp2}, A_{mp2}, \theta_{mp2}]$, is:

$$[\tau_d, A_d, \theta_d, \tau_{mp1}, A_{mp1}, \theta_{mp1}, \tau_{mp2}, A_{mp2}, \theta_{mp2}] = f \begin{bmatrix} I_1, Q_1 \\ I_2, Q_2 \\ I_3, Q_3 \\ \cdot \\ \cdot \\ \cdot \\ I_n, Q_n \end{bmatrix}$$

where the $I_i$, $Q_i$ values are the pulse-amplitude samples measured at discrete code-phase offsets along the fractional length of the expected pseudo-random-noise ("PRN") chip.

The input data from discrete sample points of the received spread-spectrum signal are samples from the composite signal, which includes the direct and the multipath signals. The accuracy of the multipath mitigation processing is inversely proportional to the thermal-noise level corrupting the samples of the incoming spread-spectrum signal. Individual samples of the signal are too noisy to achieve acceptable results, and a certain amount of filtering of the incoming signal is required to provide accurate multipath detection using the multipath mitigation techniques.

Multipath interference is usually slowly varying with respect to the frequency of the spread spectrum chip rate. Over a relatively long period of time, (a few seconds) the multipath interference affects every chip of the incoming signal the same way. The thermal noise, which dominates the signal, varies rapidly with each chip of the incoming signal and can be easily filtered.

As discussed, multipath signals always arrive after the direct path signals. Accordingly, it is desired to be able to track at the rising edges of the code chips, to minimize the adverse affects of the multipath signals. To do this, the receiver must be able to determine the start of the transition in the noisy environment. The known prior receivers have not been able to determine the start of the transition, however, because the receivers cannot reliably determine the magnitude of the direct path signal at the chip transitions in the multipath-distorted signal. The prior receivers thus cannot, through interpolation or otherwise, determine the offset between a detected signal value and the start of the associated chip transition.

SUMMARY OF THE INVENTION

The invention is a receiver and a method of operating the receiver, to correlate to the rising chip edges of a PRN code utilizing a pre-correlation filter to produce pulse shape measurements from which the magnitude of the direct path signal at the chip transitions can be determined. Once the magnitude is known, the receiver determines a threshold value that can be detected above the noise for use in calculating the location of the start of the rising edge. Based on the known characteristics of the transmitted signal, the receiver then calculates the phase delay associated with the relative location along the chip of the first signal sample value to exceed the threshold. The receiver, using a reference pulse shape, calculates the phase delay as the time offset between the associated zero crossing, which marks the start of the rising chip edge, and a point on the reference pulse shape that corresponds to the threshold-exceeding value. The offset may be determined from a calibrated reference pulse shape that is associated with the transmitted signal, or the offset may be calculated from the pulse shape image that corresponds to the pulse shape measurements.

The receiver utilizes the filter to form an image of the average chip shape of the received signal over a specified period of time. The image is expressed as a time series of complex power measurements along the length of a single chip. The averaging process retains the detail of the composite signal (direct plus multipath signals) while reducing the level of signal noise by an amount proportional to the length of the averaging process. By determining the magnitude of the direct path signal from the measurements and the relative location of the first measurement value that exceeds the threshold, the receiver determines by interpolation or other mathematical manipulations the associated phase delay as the time offset of the threshold-exceeding location from the location of the zero crossing.

The receiver includes in a receiver channel an array of complex-accumulation registers. Each complex register consists of an in-phase accumulation register and a quadrature accumulation register, and each of these accumulation registers can be separately and selectively enabled. The respective complex accumulation registers accumulate measurements that are associated with signal samples that are taken from specific ranges of locations, or code phase angles, along a spread-spectrum chip.

The length of the chip is divided into a plurality of "ranges," that is, into fractions of a chip. The ranges may but need not be the same size across the chip, and preferably the ranges are smaller near the rising edge of the chip. The ranges are associated with the respective complex accumulation registers. When a sample is taken, a corresponding measurement is added to the appropriate in-phase and quadrature accumulation registers that are associated with the range that includes the code phase angle estimated for the sample. As discussed in more detail below, the complex accumulation registers act as a pre-correlation filter, by collecting the measurements at sample times that are asynchronous with the code rate. In this way, the system avoids including associated correlation errors in the filtering process.

The system accumulates the measurements over many chips. The accumulation has essentially the same effect as a low-pass filter, and thus, wide-bandwidth noise is suppressed. The accumulated measurements, which provide the average chip shape of at least the direct path signals, are used by a multipath mitigation processing technique to compute the error of the code tracking loop due to multipath interference. The computed multipath error is then used to correct the code tracking loop, and thereby, provide more accurate pseudorange measurements. The multipath mitigation processing may also be used to compute the error of the carrier tracking loop due to multipath interference, with the computed error being used to correct the carrier tracking loop to provide even greater accuracy.

As also discussed below, the number, size and starting points of the ranges may be adjusted as the multipath mitigation processing estimates the locations of the chip transitions in the direct path signal. The ranges that include the chip edges, may be narrowed, and those that include the middle of the chip may be widened. Alternatively or in addition, the number of ranges may be reduced.

The pulse shape measurements may also be compared to a reference chip transition shape or shapes, to determine if the received signal includes interference that may cause range distortions. The receiver may then ignore the affected signals or correct for the interference, as appropriate.

The pulse shape measurements are manipulated using an MMT processing to determine the magnitude of the direct path signal at the chip transition. Using the magnitude and a starting time offset determined from a reference pulse shape, that is, from the expected signal shape, the receiver sets a threshold for finding the start of the chip transition. The receiver then determines in which range, or "bin," the pulse shape measurements first exceed the threshold and interpolates how far the bin is from the start of, that is, the zero crossing of, the chip transition, to determine the associated code delay.

To correlate to the rising chip edges, the receiver uses the MMT processing at predetermined time intervals, for example, once every 10 to 30 seconds, to determine the magnitude of the direct path signal. Accordingly, the receiver need not engage in the computation intensive MMT processing constantly for the rising edge correlation. The receiver sets the threshold as a percentage of the magnitude, and looks at the pulse shape measurements in the bins starting from the least to the most delay, to determine in which bin the measurements first exceed the threshold. The receiver then determines the time delay from this sample point to the zero crossing, i.e., the rising chip edge, by interpolating from the reference pulse shape, which has been scaled to the magnitude of the expected pulse amplitude as determined from the periodic MMT processing.

In the ideal application of the invention, all transitions will be used, they will be inverted where required to align them so they are all rising edges (or falling edges). That provides the maximum signal to noise ratio. The last half of the first chip becomes the first half of the second, if there are two sequential transitions. Accordingly, the term "rising edge" should be understood to include both rising and falling edges.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
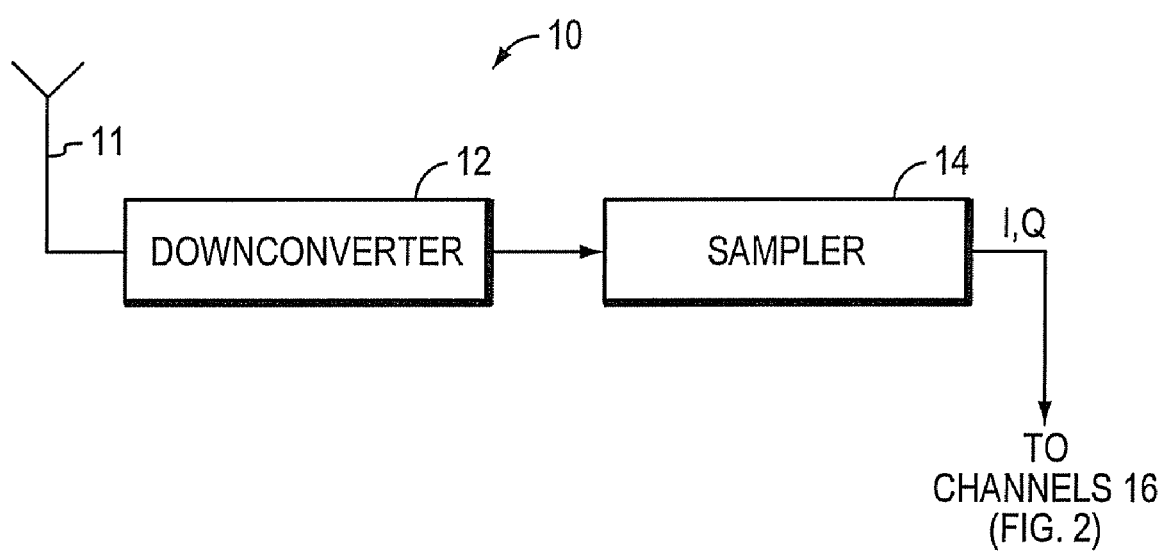
FIG. 1 is a block diagram of a spread-spectrum receiver that employs the present invention's teachings.

Referring to FIG. 1, a receiver 10 receives over an antenna 11 a composite signal that includes direct path signals and associated multipath signals. A downconverter 12 and sampler 14 operate in a conventional manner, to downconvert the received composite signal and in the exemplary embodiment take sequential samples of the downconverted signal. The sequential samples are provided to the respective channels 16 (FIG. 2).

Figure 2:
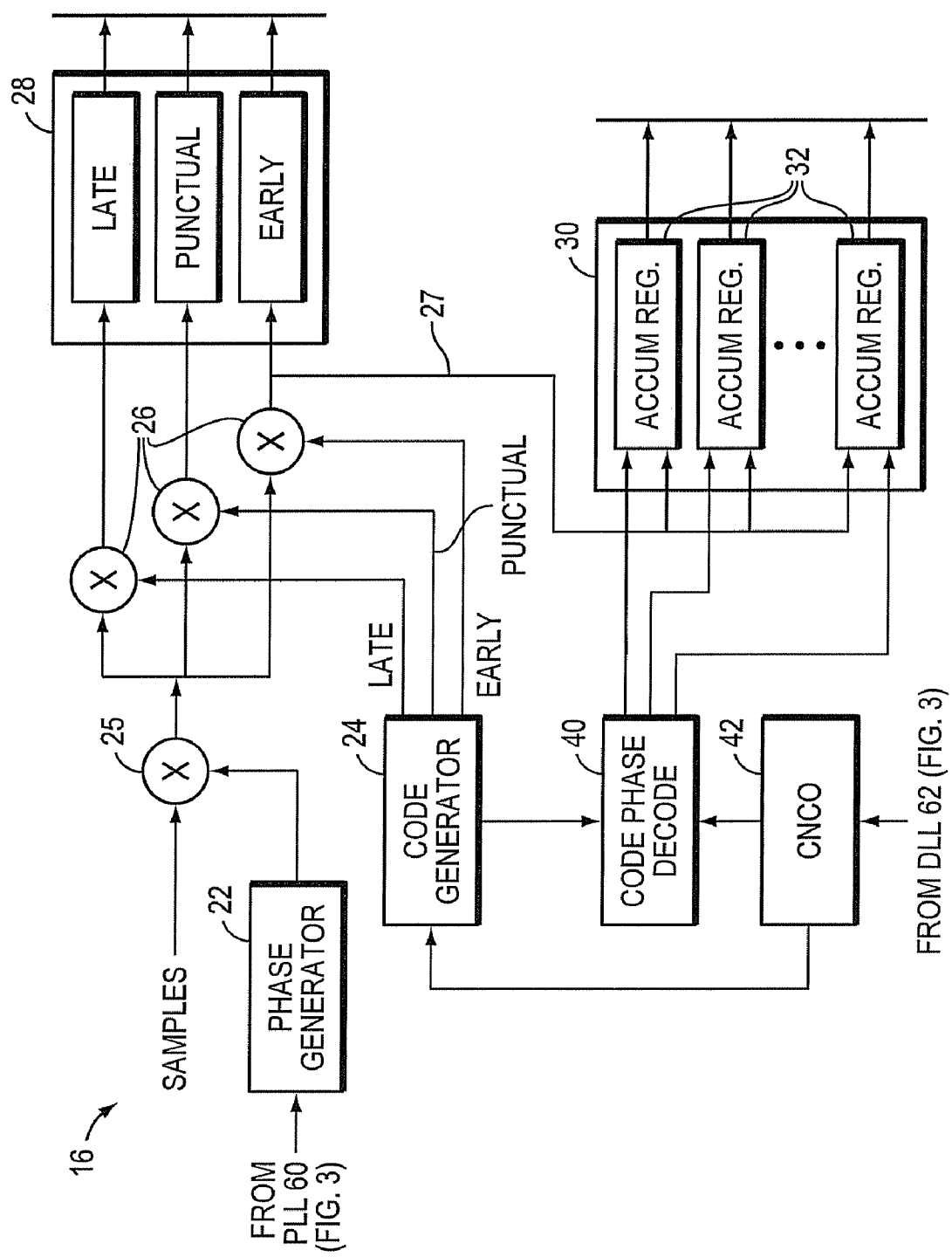
FIG. 2 is a more-detailed block diagram of a receiver channel.
Figure 3:
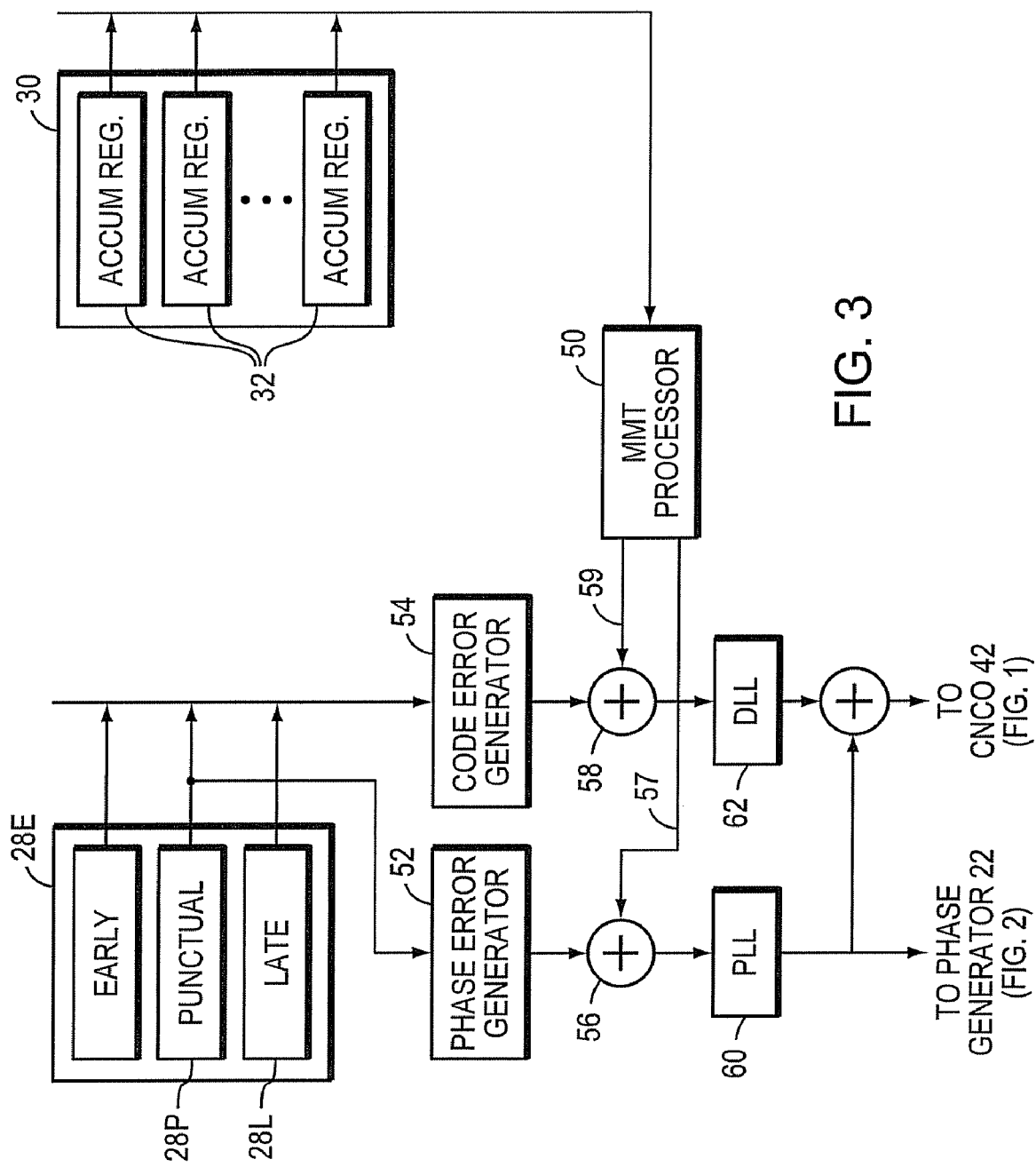
FIGS. 3 and 4 are more detailed block diagrams of components of the channel.

Referring now to FIG. 2, a given channel 16 includes a mixer 25 that removes the carrier from the samples by mixing them with an estimate of the carrier phase. Thus, in a know manner, the sequential samples are each mixed with both sine and cosine transformations of the estimated carrier phase to produce a corresponding complex I and Q sample pair. The carrier phase estimate is generated by a phase generator 22, which is controlled in a known manner by a carrier tracking error signal that is produced by a carrier phase lock loop ("PLL") 60 (FIG. 3). As discussed in more detail below with reference to FIG. 3, the PLL is controlled by a carrier phase error signal that is first manipulated to remove therefrom the adverse affects of multipath.

The channel 16 further includes a spread-spectrum code generator 24, which operates in a known manner to produce a locally-generated spread-spectrum code that corresponds to one of the codes in the received signal. In the example of a GPS system, the code generator 24 produces a locally-generated PRN code that is the same as the code that is transmitted by one of the satellites then in view. The code generator 24 further produces phase-delayed versions of the locally generated spread-spectrum code. The versions may be, for example, one-half chip Early, Punctual, and one-half chip Late versions. The I and Q samples are multiplied by the Early, Punctual and Late versions of the code in multipliers 26, to produce corresponding early, punctual and late measurement signals. The measurement signals are accumulated in Early, Punctual and Late complex accumulators 28. The operations of the complex accumulators are described in more detail below with reference to FIG. 5.

A code numerically controlled oscillator ("CNCO") 42 drives the code generator 24, to bring the local code into alignment with the received code. The CNCO is, in turn, driven by a code tracking error signal, which is based on a DLL error signal that is produced by a code tracking delay lock loop ("DLL") 62 (FIG. 3). As discussed in more detail below with reference to FIG. 3, the DLL is controlled by a code error signal that is first manipulated to remove therefrom the adverse affects of multipath. The CNCO 42 is discussed in more detail with reference to FIG. 4 below.

The early measurements on line 27 are also provided to an array 30 of complex accumulation registers 32. As discussed in more detail below, a code phase decoder 40 selectively enables the accumulation registers, such that a given early measurement is accumulated by the appropriate accumulation register 32. The accumulated measurements from the respective registers are provided at appropriate times to a multipath mitigation processor 50, which is referred to hereinafter as the "MMT" processor (FIG. 3). As discussed in more detail below, the multipath mitigation processor processes the measurements in accordance with a known multipath mitigation technique ("MMT"), to determine at least an estimate of the location of the chip edge of the direct path signal from the array of accumulated pulse shape measurements 32. The multipath mitigation processor 50 further produces carrier tracking and code tracking multipath error signals on lines 57 and 59, respectively. The signals are used by adders 56 and 58 to remove adverse affects of multipath from the carrier and code tracking operations.

Referring now also to FIG. 3, a phase error generator 52 converts the values accumulated by the Punctual accumulator 28P to a phase error signal in a conventional manner, using an arctan-like function. The adder 56 corrects the phase error signal by adding thereto the multipath phase correction signal produced by the MMT processor 50. The multipath-corrected phase error signal is then used by the PLL 60, to produce the phase tracking error signal that controls the phase generator 22.

A code error generator 54 uses the early, punctual and late values from the Early, Punctual and Late accumulators 28E, 28P, 28L in a conventional manner to estimate a code error using a formula that corresponds to the following:

$$CodeError = \frac{I_E^2 + Q_E^2 - I_L^2 - Q_L^2}{I_P^2 + Q_P^2}$$

An adder 58 corrects the code error signal produced by the code error generator 54 by adding thereto a multipath code phase correction signal produced by the MMT processor 50. The multipath-corrected code error signal is then used by the DLL 62, to produce the associated DLL error signal. An adder 64 combines the DLL error signal with the carrier tracking error signal produced by the PLL 60, to correct for changes in Doppler. The result is the code tracking error signal that is supplied to the CNCO 42.

Figure 4:
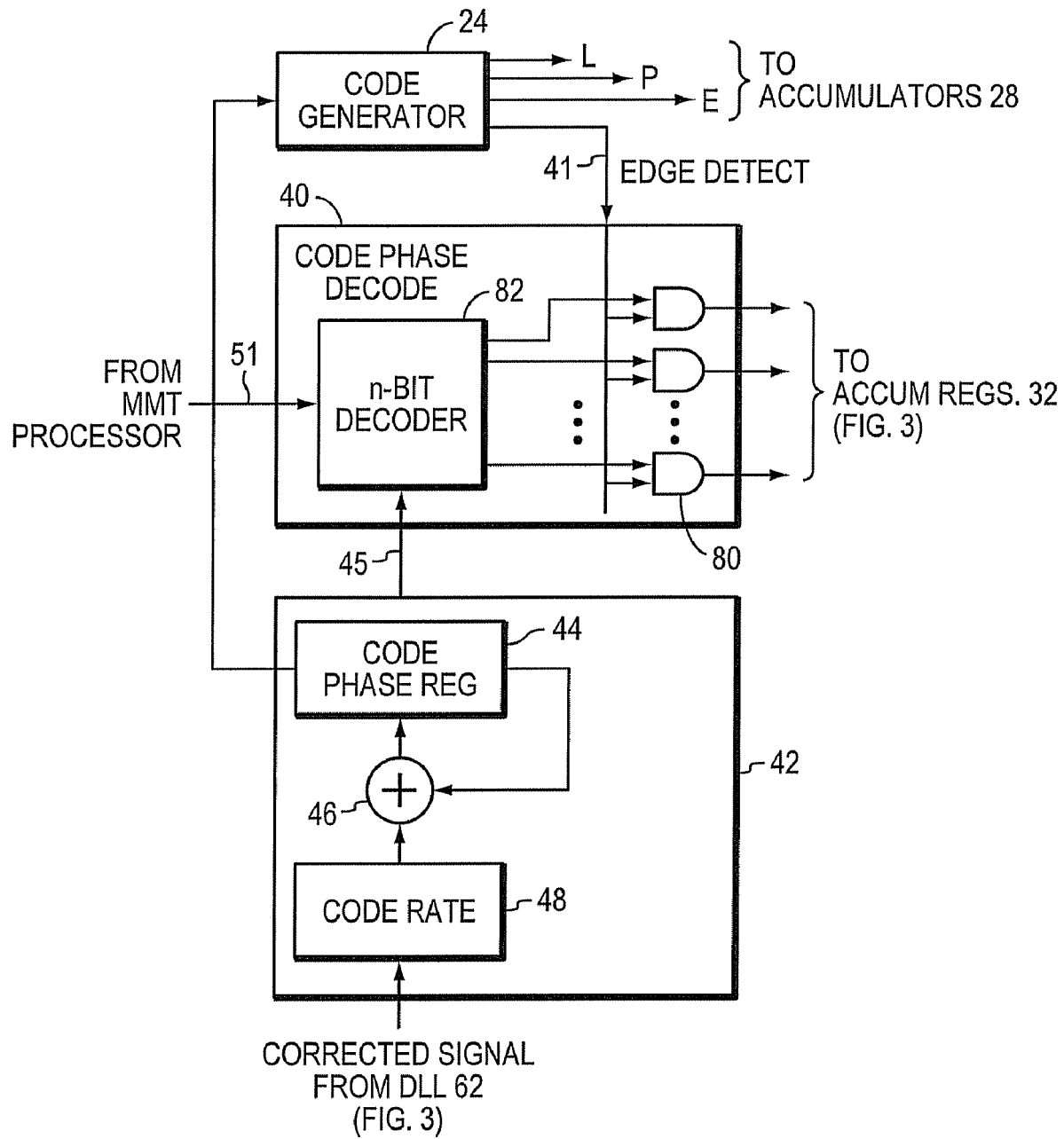

Referring now also to FIG. 4, the CNCO 42 produces chip-edge clock signals, which are used to align the phase of the locally-generated punctual PRN code produced by the code generator 24 to the phase of the received code. The CNCO also produces fine code chip phase detail signals that are used to represent the estimated code phases of respective I and Q samples. The CNCO includes a code rate register 48 that controls a code phase register 44. The code rate register produces a code rate error signal that is combined, in adder 46, with a code phase register feedback. The result drives the register to produce the code generator control signal at appropriate times. The correction provided by the code rate register is based on the code tracking error signal.

The code phase register at any given time contains a count that corresponds to estimated code phase, that is, to an estimated phase angle. When the count corresponds to the start of a new chip, the code phase register provides a signal to the code generator 24, which then produces the next chip of the locally generated code. The signal produced by the code phase register is synchronous with chip times in the early version of the local code. At every sample clock time the code phase register also provides the phase angle value to the code phase decoder 40, which controls the complex accumulation registers 32.

Figure 5:
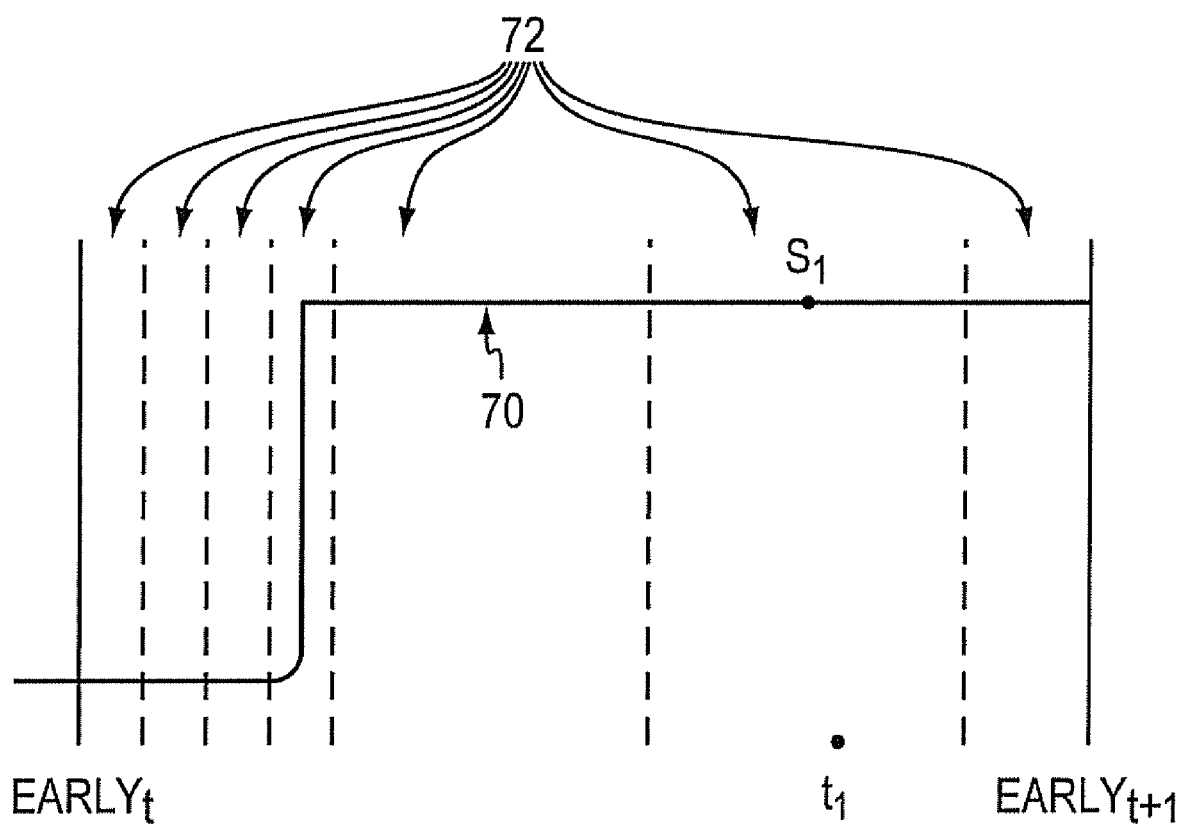
FIG. 5 is an illustration of code chip ranges.

Before discussing the operations of the code phase decoder 40 in more detail, we refer to FIG. 5 to describe the code chip ranges that are associated with the accumulation registers 32. As shown in the drawing, a code chip 70 is segmented into a plurality of code chip ranges 72, each of which is a fraction of a code chip. The sample $s_1$ taken at time $t_1$ has a phase angle that is included in a range that covers the middle of the chip. As illustrated, the ranges near the chip rising edge may be smaller than the ranges that are near the middle of the chip, to provide more measurement detail to the MMT processor 50.

Referring again to FIG. 4, at each pulse of the sample clock (not shown) the code phase register 44 provides to the code phase decoder 40 a phase value that corresponds to the estimated position, or phase angle, of the corresponding sample relative to the underlying code chip. Thus, at sample time $t_1$ (FIG. 5), the code phase register provides to the code phase decoder a phase angle value that corresponds to the sample's mid-chip position. An n-bit decoder 82 decodes the phase angle value into signals that drive a plurality of AND gates 80. The AND gates 80 produce signals that selectively disable all but the complex accumulation register 32 that corresponds to the mid-chip range that includes the estimated phase angle of the sample. The enabled complex accumulation register 32 then accumulates the early measurement value that corresponds to the sample.

Figure 6:
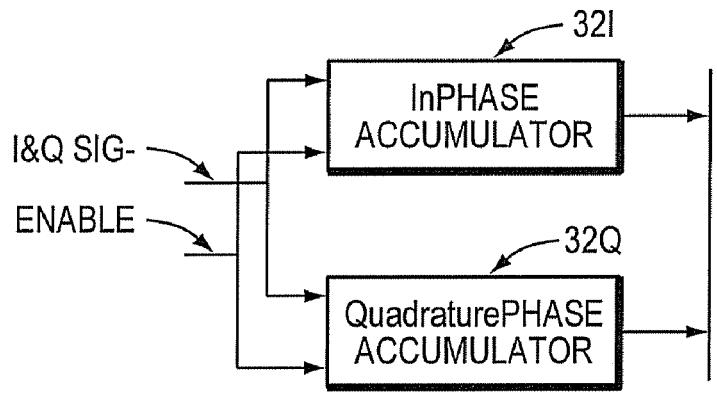
FIG. 6 is a block diagram of a complex accumulator.

As shown in FIG. 6, a complex accumulation register 32 includes Inphase and Quadrature phase registers 32I and 32Q. The I and Q samples are preferably processed separately by the receiver, since the samples may be associated with different ranges. The signals produced by the code phase decoder thus selectively enable only one of the complex register pairs, such that the measurement is collected by the appropriate complex accumulation register 32.

The code generator 24 also produces an edge detect signal on line 41, which is used by the AND gates 80 of the code phase decoder 40 to assert an enable signal for the array 30 of complex accumulation registers 32. Following a chip polarity change in the locally generated code, the edge-detect signal is enabled and remains enabled for the entire chip. The edge-detect signal is not enabled at the start of a chip when there is no change in the chip level, since the information that is most useful to the MMT processor 50 is produced during the chip-edge transitions. The corresponding measurement values may instead be accumulated in an accumulation register that is selectively enabled when the edge detect signal is not enabled. These measurements, which include very little phase modulation, are provided at appropriate times to the MMT processor 50.

The early measurements, that is, the results of multiplying the downconverted complex signal and the early version of the local code, are used for the complex-accumulation registers 32 in the embodiment described herein. However, any of the early, punctual or late measurements may instead be used, as long as the edge-detect signal is made synchronous with the selected measurements.

Figure 7:
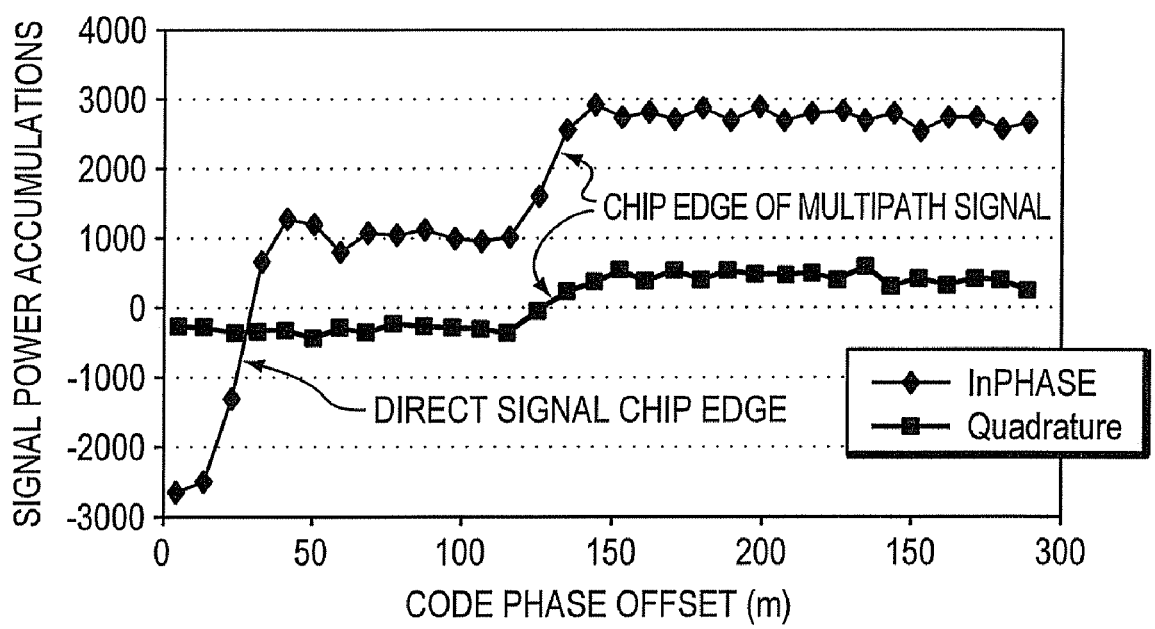
FIG. 7 is an example plot of the accumulated values taken by the complex accumulation registers.

In operation, a satellite signal is acquired by the channel 16 in the usual manner. After the receiver is tracking in a steady-state phase locked loop, the contents of the complex-accumulation registers 32 are provided to the MMT processor 50. The MMT processor 50 processes the signals and determines if there is multipath interference. An exemplary set of a set of measurements of signals containing multipath interference is shown in FIG. 7. It can be seen in this example that the effect of the multipath signal can be easily distinguished from the chip edges of the direct signal. The measurements, which are based on 32 equally-sized ranges, provide the MMT processor with a very accurate representation of the received signal transmission chip shape. Using these measurements, the MMT processor operates in accordance with known MMTs to produce the code and carrier multipath error signals that remove the adverse affects of multipath interference from the code and carrier tracking operations. With the accurate representation of the direct path chip edges, the MMT processor 50 produces more accurate multipath code and carrier error signals in terms of code and carrier offsets. This leads directly to more accurate tracking of the direct signal code and carrier, and ultimately to more accurate pseudoranges.

After testing, it was determined that the chip may be advantageously divided into 4 to 8 ranges, although more may be used as in the example above. Four accumulation registers provide measurements from which the MMT processor 50 can accurately derive at least the chip edges in the direct path signal. Using the measurements from additional registers, the MMT processor may also accurately derive the chip edges of one or more multipath signals. If four accumulation registers are used, a first accumulation register is arranged to accumulate measurements from samples taken before the leading edge of the chip; a second accumulation register is arranged to accumulate measurements from samples taken from the start of the leading edge of a chip to a point mid-way along the edge; a third accumulation register is arranged to accumulate measurements taken from the mid-way point to the top of the leading edge of the chip; and a fourth accumulation register is arranged to take measurements from the top of the leading edge to the start of the range associated with the first accumulation register. As an example, the fourth accumulation register may collect measurements associated with samples taken along the chip to the falling edge. Three accumulation registers may ultimately be used, with the bounds for the range that covers the leading chip edge selected to provide sufficient information to the MMT processor 50.

The receiver collects pre-correlation measurements in the complex accumulation registers 32. The measurements are pre-correlation in the sense that the system does not drive the sample clock to take samples at pre-determined times relative to the estimated code chip boundaries. The system thus does not incorporate associated correlation errors into the measurements.

Once the MMT processor 50 estimates the locations of the chip edge in the direct path signal, the MMT processor 50 may adjust the ranges by, for example, shifting the starting points of and/or narrowing the ranges that include the estimated location of the chip edge and, as appropriate, widening the other ranges. Alternatively, or in addition, the MMT processor may reduce the number of ranges, such that the measurements associated with the mid-chip locations are included in fewer ranges, and so forth. To do this, the MMT processor controls the operations of the n-bit decoder, such that the decoder produces signals that enable the appropriate registers. When, for example, ranges associated with the chip edges are shifted or narrowed, the MMT processor 50 on line 51 communicates changes in the code phase offset values that are associated with the signals that the decoder produces to enable respective accumulation registers 32. The MMT processor 50 may vary the length, number and/or starting positions of the ranges by appropriately changing the code offset values associated with the respective accumulators.

The MMT processor may also compare the measured pulse shape with a reference chip transition shape, to determine if the received transmission includes other interference that may distort the calculated range. This is particularly important in safety-of-life applications, such as aircraft landings. The interference that can be detected in this manner is a type that affects the correlation operations of various receivers differently, and is otherwise hard to detect. Examples are satellite errors (including satellite component failures), microwave interference from nearby radio sources, receiver radio failures (including component failures), and so forth. Using the accurate pulse shape information provided by the complex accumulators 32, the MMT processor 50 is able to determine when such interference is present. The receiver may then ignore the received signals that include the interference or, as appropriate, correct for the distortion in the ranging calculations.

The complex accumulation registers 32 may be selectively grouped and their contents combined to provide signals that correspond to the accumulated early, punctual and late correlation values produced by the Early, Punctual and Late accumulators 28. Alternatively, or in addition, the complex accumulation registers 32 can be grouped to produce correlation values that correspond to the values produced by multiple early and multiple late correlators. The MMT processor 50 can thus operate as if using the multiple early and late correlators, without requiring any additional correlator hardware. Further, the receiver can change the groupings to narrow the effective correlator spacings.

The signals produced by the MMT processor 50 may instead be used directly to control the phase generator 22 and the CNCO 42. The MMT processor thus provides to these components as feedback signals the calculated direct path code time offset and phase angle, and the Early, Punctual and Late accumulators, PLL and DLL may be eliminated from the signal tracking operations. Thus, switches (not shown) may be added to the circuitry such that in one position the MMT processor corrects for multipath errors in the associated code and phase error signals produced by the phase error generator 82 and the code error generator 54. When the switches are in second positions, the signals produced by the MMT processor 50 are used directly to control the phase generator 22 and the CNCO 42.

In order to calculate the magnitude of the direct path signal at the chip transition, the MMT processor periodically performs its calculations using the pulse shape measurements, for example, every 10 to 30 seconds. Once the receiver determines the magnitude of the direct path signal, the receiver sets a threshold that is a fraction of the maximum amplitude and above the signal noise. The receiver then searches through the measured complex samples or bins, starting from the earliest (least delayed) to the latest (most delayed), to determine the first bin that includes an accumulated value that exceeds the threshold.

The receiver searches through the accumulated I values if the receiver is phase locked to the direct path signal. Otherwise, the receiver first rotates the samples to remove the phase error. To determine if phase lock has been achieved, the receiver uses the results of the periodic MMT processing to monitor the phase error of the PLL. If the multipath-corrected phase error signal provided to the PLL by the MMT processor is relatively large, e.g., over 10°, the receiver rotates the samples to remove the phase error and before searching for the threshold-exceeding value. Alternatively, the receiver may look for a radius change $v=\sqrt{I^2+Q^2}$ that exceeds the threshold.

The receiver next uses the signal magnitude determined by the MMT processor, the threshold-exceeding value and the associated location along the chip to predict to the time of the associated zero crossing. The receiver then determines the associated phase delay by determining the offset between the time at which the first signal exceeded the threshold and the time of the zero crossing.

Figure 8:
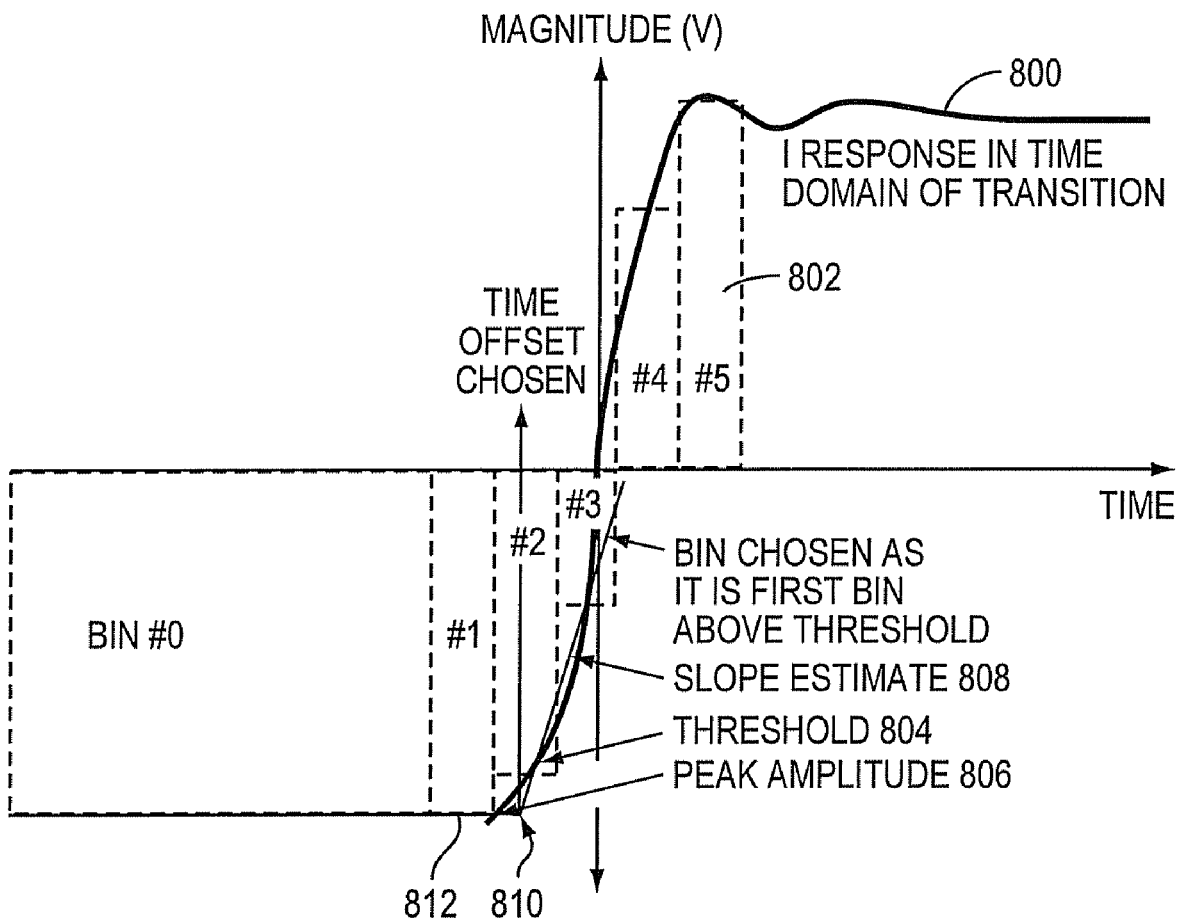
FIG. 8 is a graph that illustrates an embodiment of the system.

Referring now to FIG. 8, the time domain response 800 of the transition of the signal on an in-phase channel is shown. The locations of the ranges, denoted as bins 802, over which pulse measurement values are accumulated are depicted by dotted lines. A threshold 804 is set as a predetermined fraction of the maximum amplitude 806 of the direct path signal, for example, 0.99 or 0.9 of the maximum. The receiver next searches through the bins from the left to the right to locate the first bin that contains a value that exceeds the threshold. The threshold-exceeding value is normalized using the maximum amplitude determined by the MMT processing and the normalized value is used to determine the corresponding point on an associated calibrated reference pulse shape (not shown) that is predetermined for the satellite and receiver RF characteristics. The receiver then determines the associated phase delay as the time offset between the location of the reference pulse zero crossing and the point on the reference pulse that corresponds to the threshold-exceeding value.

Alternatively, the receiver may calculate a slope from the expected slope of the rising edge of the reference function and the MMT estimate of the signal magnitude in the area just above the threshold. A line 808 having the calculated slope is then extended through the selected sample, that is, through the first sample that exceeded the threshold, to a projected location 810 of the associated zero crossing. The phase delay corresponds to the time offset between the projected zero crossing and the selected sample.

As yet another alternative, the receiver may calculate a slope directly from the measurements by drawing a line through the measurements in the first two bins past the threshold, that is, through the selected sample and the sample in the adjacent bin, and projecting the zero crossing as the location at which the line intersects with a horizontal line 812 that is drawn through the measurements in the bins that precede the threshold. Assuming the threshold is sufficiently close to the maximum amplitude of the direct path signal, the horizontal line will run through all of the measurements in the bins that precede the threshold. Otherwise, the receiver uses a line that best fits the measurements that precede the threshold.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention, including substituting the values produced by the MMT processor 50 for the Early, Punctual and Late accumulators, such that the DLL and PLL are eliminated, along with associated Punctual and Late versions of the local code. Further, the received signal may be sampled to produce simultaneous I and Q samples, and the mixer is then a complex mixer. The simultaneous samples are then processed in parallel, since each I and Q pair will always occur in the code chip range. The MMT processing to determine the signal magnitude may be performed more or less often depending on the environment in which the receiver is then operating, with the process performed more often in noisier environments and/or environments associated with more multipath distortion. The calibrated reference pulse shapes may be predetermined using pulse shape measurements taken in environments with few or no multipath sources and/or the calibrated reference pulse shapes may be determined using techniques described in co-pending U.S. Pat. No. 7,298,324, which was issued on Nov. 20, 2007 by Allan Manz and entitled APPARATUS AND METHOD OF INCLUDING CALIBRATED PULSE SHAPES IN GPS RECEIVERS the teachings of which are incorporated herein in its entirety by reference.

What is claimed is:

1. In a receiver for ranging signals which comprise RF carriers, each of which is bi-phase modulated with a different pseudo-random code, the receiver having a controllable code generator for generating a local replica of a selected transmitted code, and further having a delay lock loop that generates an error signal used to control the code generator to align the local code replica with the direct-path component of the received signal, the improvement comprising:
   A. means for dividing at least the rising edge of each receiver code chip into multiple intervals and providing enabling signals corresponding with the intervals;
   B. a set of accumulators, each of which is enabled to receive a sample of the signal in response to a different one of the enabling signals, whereby the contents of the set of registers provide an outline of at least the beginning of the rising edge of a received code chip;
   C. an MMT processor that
      1) compares the outline of the start of the rising edge with a model of the outline of the rising edge of the received signal, and
      2) provides corrections to the delay tracking loop to make the timing of the code generator more closely correspond to the zero crossing of the direct path component of the received signal and thereby mitigates the effect of multi-path components in the received signal.

2. The receiver defined in claim 1 in which the accumulators are reset by the MMT processor.

3. The receiver defined in claim 2 in which the MMT processor resets the accumulators after a multiple number of code chips, thereby to lessen the effect of high frequency noise in the contents of the accumulators.

4. The receiver of claim 1 also including:
   A. a phase lock loop for aligning a locally generated carrier with the received carrier and generating a phase error signal corresponding with the degree of misalignment of the carriers; and
   B. in which the MMT processor provides a correction to the phase error signal, the correction corresponding with the misalignment of the received rising edge and the model rising edge.

5. The receiver of claim 1 wherein the means for dividing divides the remainder of each chip into a single interval.

6. The receiver of claim 1 wherein the dividing means divides the entire chip into multiple intervals.

7. The receiver of claim 6 wherein the intervals corresponding to the chip edge are narrower than the intervals corresponding to the remainder of the chip.

8. In a receiver for ranging signals which comprise RF carriers, each of which is modulated with a different pseudo-random code, the receiver having a code generator for generating a local replica of a selected transmitted code, the improvement comprising:
   A. means for dividing at least the rising edge of each received code chip into multiple intervals and providing enabling signals corresponding with the intervals;
   B. a set of accumulators, each of which is enabled to receive a sample of the signal in response to a different one of the enabling signals, whereby the contents of the set of registers provide an outline of at least the beginning of the rising edge of a received code chip; and
   C. means for providing the outline of the rising edge of a reference pulse having the outline of an undistorted pulse received in the receiver;
   D. an MMT processor that:
      1) calculates the amplitude of an undistorted version of a pulse transition in the code of the signal that is received,
      2) uses the amplitude to compute a threshold,
      3) uses the threshold to ascertain which accumulator contains a value that matches or exceeds the threshold,
      4) interpolates from the expected (scaled by amplitude) reference wave form the location of the sample represented by the selected accumulator, and
      5) computes the tracking error by comparing the location of the sample and the expected location of the selected accumulator.

9. The receiver of claim 8 which
   A. includes a tracking loop for aligning the code replica with the code in a received signal; and
   B. uses the offset to align the local code with the received code.

10. The receiver of claim 8 wherein the means for dividing divides the remainder of each chip into a single interval.

11. The receiver of claim 8 wherein the dividing means divides the entire chip into multiple intervals.

12. The receiver of claim 11 wherein the intervals corresponding to the chip edge are narrower than intervals corresponding to the remainder of the chip.

* * * * *

UNITED STATES PATENT AND TRADEMARK OFFICE
CERTIFICATE OF CORRECTION

PATENT NO.        : 7,668,228 B2                                    Page 1 of 1
APPLICATION NO. : 11/520353
DATED             : February 23, 2010
INVENTOR(S)       : Feller et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Seventh Day of December, 2010

David J. Kappos
*Director of the United States Patent and Trademark Office*